Figure 3:
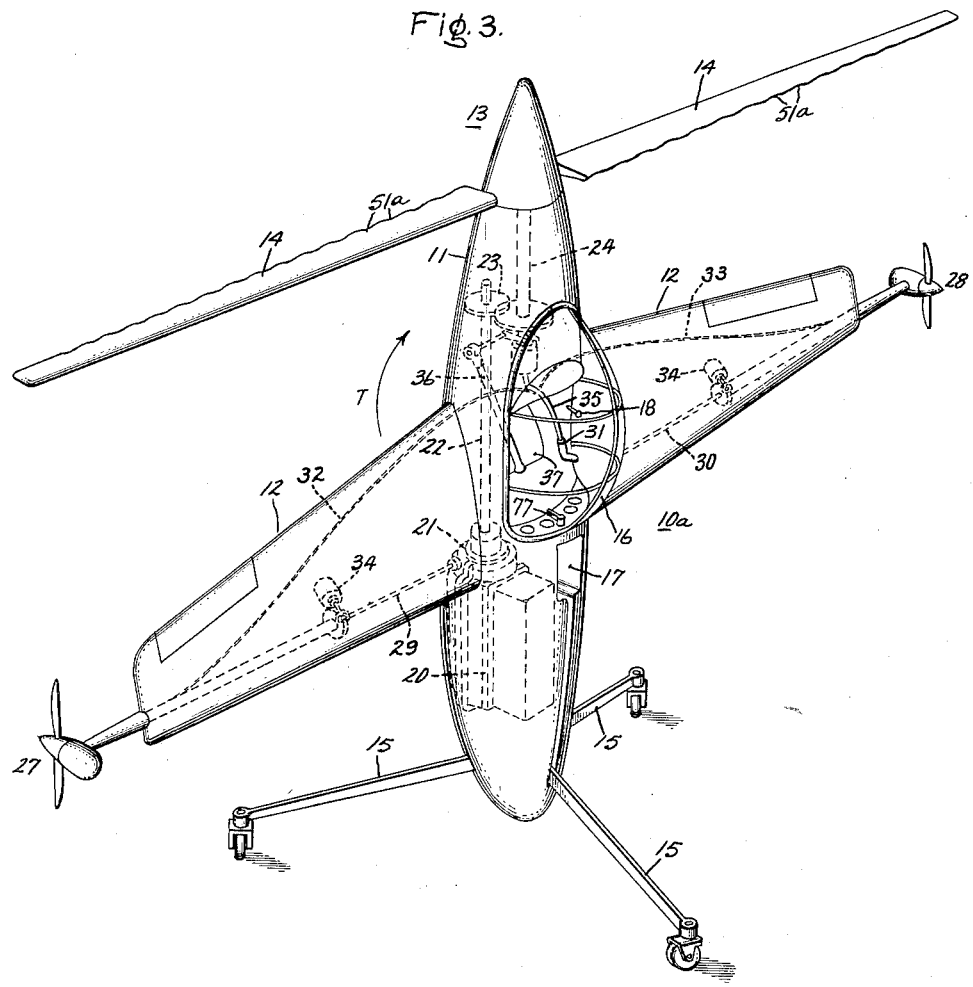

Dec. 23, 1952  D. C. PRINCE  2,622,826
HELICOPTER AIRPLANE
Filed June 27, 1946  4 Sheets-Sheet 1
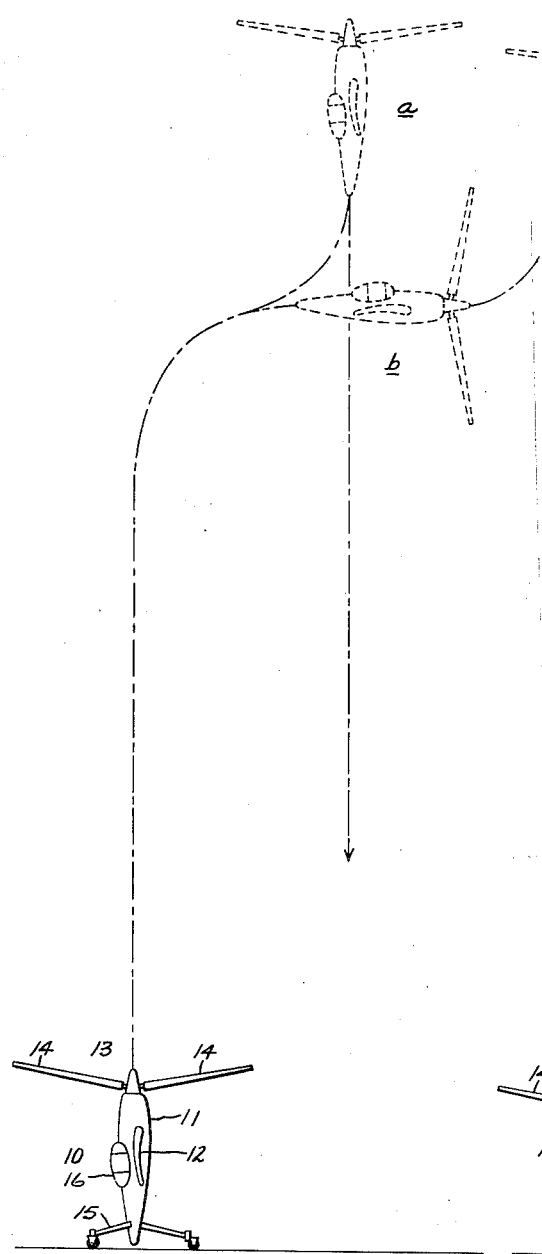
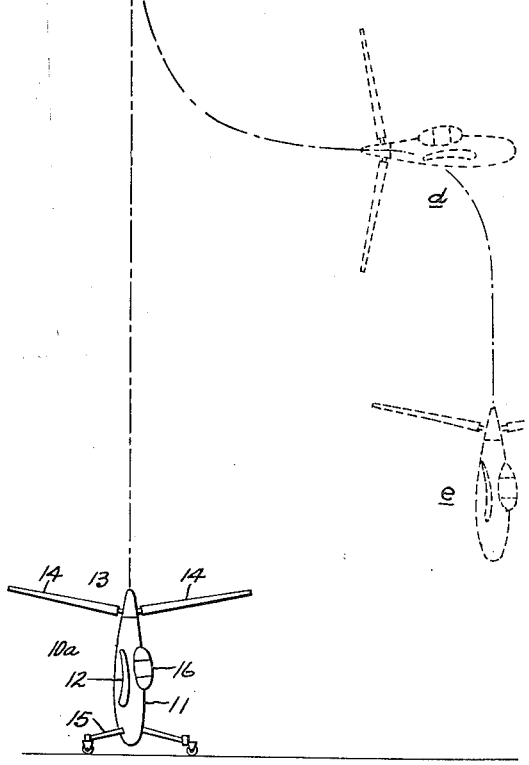
Inventor:
David C. Prince,
by *Edwin L. Rich*
His Attorney.

Dec. 23, 1952   D. C. PRINCE   2,622,826
HELICOPTER AIRPLANE
Filed June 27, 1946   4 Sheets-Sheet 2

Inventor:
David C. Prince,
by Edwin L. Rich
His Attorney.

Dec. 23, 1952  D. C. PRINCE  2,622,826
HELICOPTER AIRPLANE
Filed June 27, 1946  4 Sheets-Sheet 3
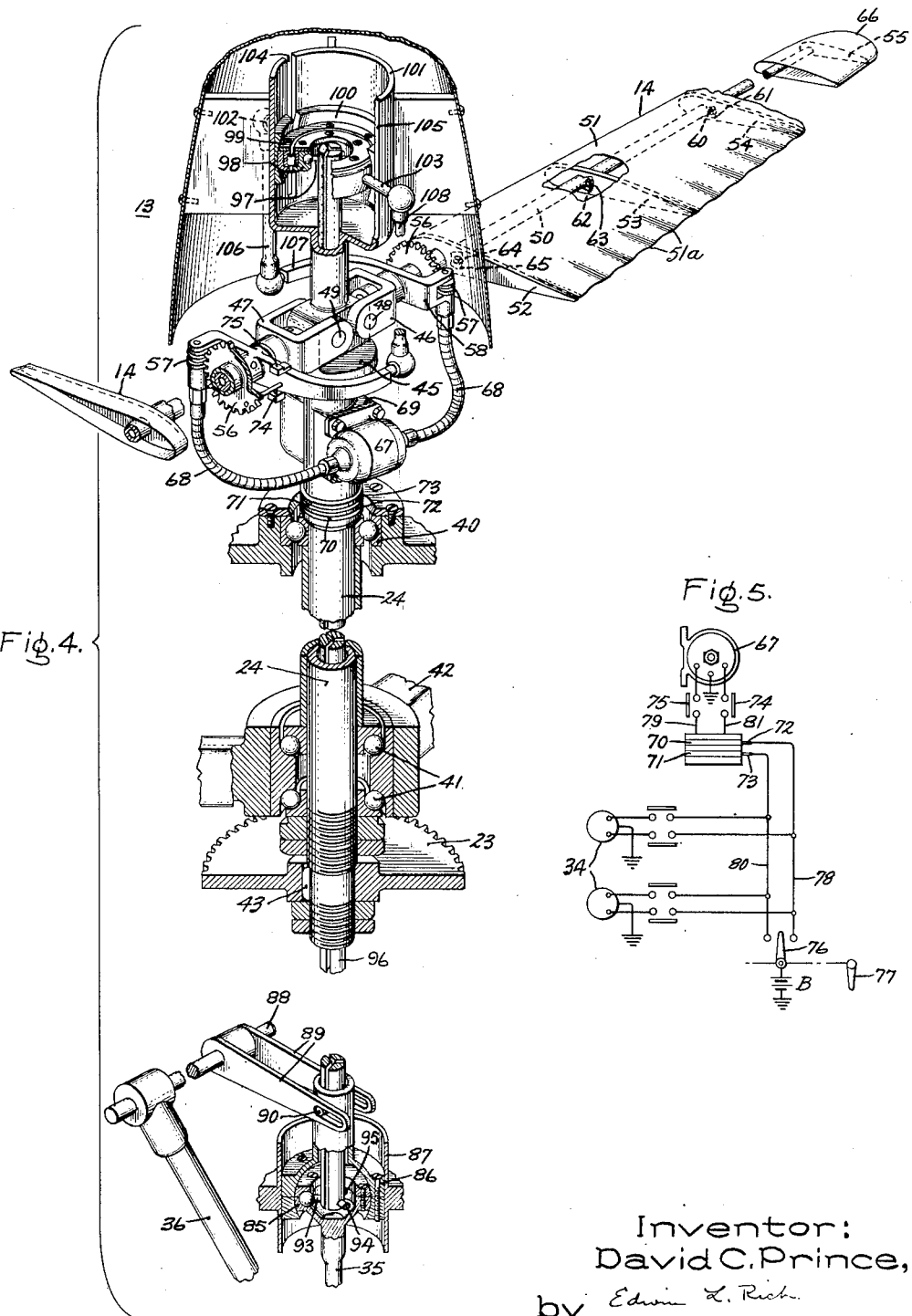
Inventor:
David C. Prince,
by Edwin L. Rich.
His Attorney.

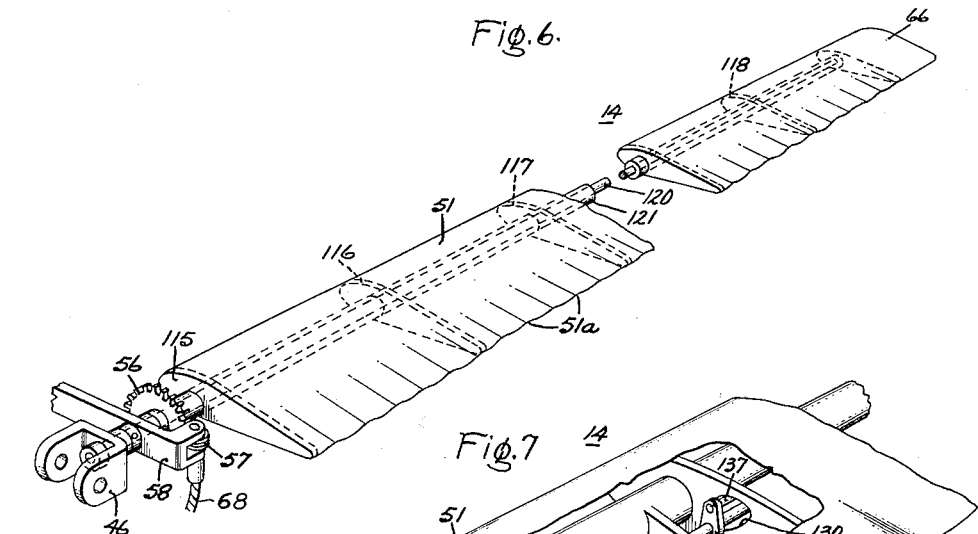
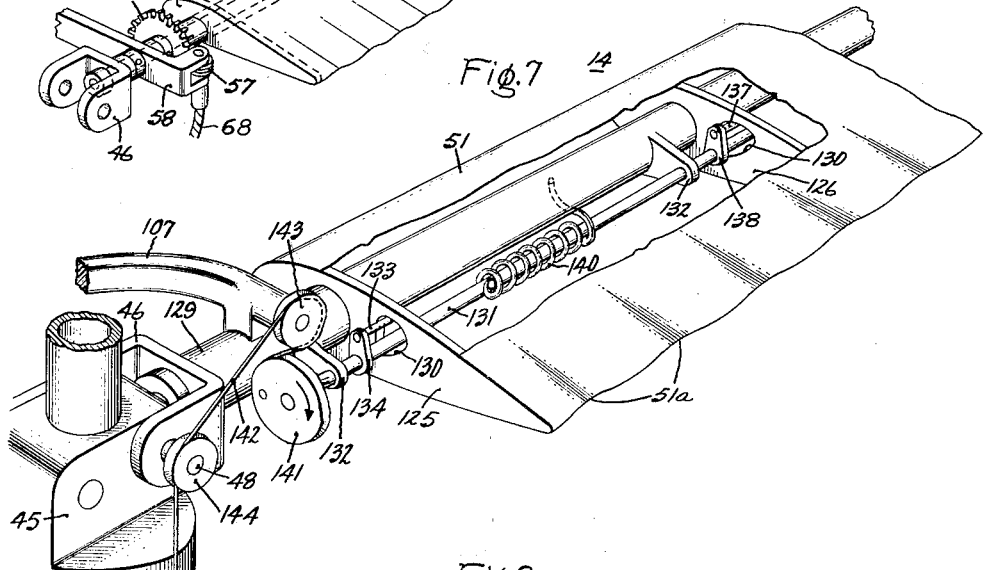
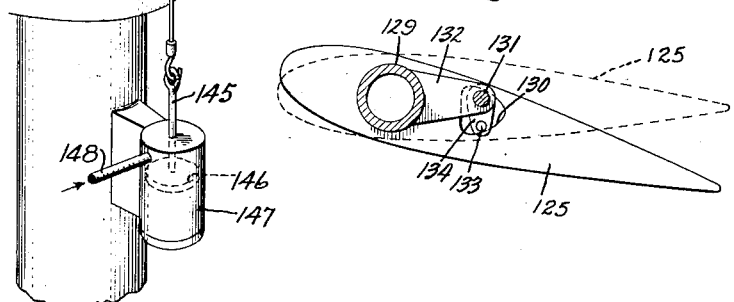

Patented Dec. 23, 1952

2,622,826

UNITED STATES PATENT OFFICE 2,622,826

HELICOPTER-AIRPLANE

David C. Prince, Schenectady, N. Y., assignor to General Electric Company, a corporation of New York Application June 27, 1946, Serial No. 679,652

3 Claims. (Cl. 244—7)

The invention relates to aircraft, particularly airfoil sustained aircraft for flying both vertically and horizontally and to improved variable warp rotary airfoil convertible sustaining and propelling means therefor.

One of the principal objects is to provide an improved form of convertible airfoil sustained aircraft that can hover like a helicopter and slowly and safely ascend vertically from or descend vertically into a small restricted spaced and still fly as fast or faster horizontally than a conventional airplane.

A further object is to provide the improved aircraft with a high speed low drag airplane wing structure and fuselage equipped at one end with special vertical axis landing and takeoff gear and at the opposite end with an improved form of power driven centrifugally extended convertible propelling and sustaining variable warp and pitch rotary blade mechanism for effecting and variably controlling the vertical ascent, descent, and hovering of the aircraft, as well as the horizontal flight. Such an improved convertible airfoil sustained aircraft has a wide field of service since it is entirely free from high speed landing and takeoff runways as well as many other limitations involved in the present-day methods of basing and flying military, commercial and private aircraft of conventional form.

Another object is to provide an improved form of convertible aircraft having wings and a pusher propeller capable of backing the aircraft vertically into the air as well as propelling the craft forwardly in horizontal flight.

A special object is to provide an improved form of power driven convertible aircraft propelling and sustaining rotor having twistable or variable warp blades of the articulated centrifugally extended variable coning thrust type combined with improved control mechanism therefor capable of variably controlling not only the average pitch of the blades and the individual blade pitch cyclically but also selectively varying the twist or warp of the blades over a relatively wide range. This widely variable blade pitch and warp combination enables the improved propeller to serve effectively for both airplane and helicopter flight. Aircraft propulsion apparatus capable of fulfilling this object and described hereinafter also forms a portion of the subject matter described and claimed in my application entitled "Propulsion Apparatus for Convertible Flight Aircraft," Serial No. 291,493, filed as a division of the present application on or about June 3, 1952.

With modern construction the improved convertible aircraft may be built with about 6 pounds of weight or less per horsepower. Present forms of rigid blade variable pitch airplane propellers now available provide a maximum vertical stalled thrust of only about 3 pounds per horsepower. But a modern helicopter sustaining rotor with articulated variable coning centrifugally extended blades is capable of providing a maximum lifting thrust of something over 6 pounds per horsepower. However, the blades of both the conventional airplane propeller and the helicopter sustaining rotor have a fixed twist or warp adapted for their respective normal operating ranges.

In accordance with the present invention, the improved aircraft is provided with an improved convertible form of power driven twistable blade propelling and sustaining rotor and variable twist and pitch control mechanism therefor in order to obtain an upward maximum stalled thrust greater than the total weight of the aircraft in landing and takeoff. This enables the craft to rise vertically from the ground and to hover when the variable twist and pitch of the rotor blades are both made relatively small. In descent the blade pitch can be slightly reversed in order to provide for continued free auto-rotation in the case of engine failure. In high speed horizontal airplane flight, the required horizontal thrust of the rotor becomes must less since the lift-drag ratio of the airfoils for sustaining the weight of the improved convertible aircraft in high speed horizontal flight may vary approximately from 10 to 20. Thus. the forward thrust required of the rotor is only about $\frac{1}{10}$ or $\frac{1}{20}$ of the total weight of the plane. But in this case, both the blade pitch and twist necessary to produce such high speed horizontal flight is very much greater than the pitch and twist required in ascent, hovering or descent because the craft is advancing very rapidly through the air. Hence the principle of the present invention is to obtain successful convertible aircraft operation by widely varying the twist or warp conformation of the rotor blades as well as their pitch in accordance with the widely different vertical and horizontal flight conditions. Each blade is variably twisted or warped retrogressively between root and tip and the pitch adjusted so as to provide in effect a substantially constant angle of incidence with respect to the air in the relatively slow ascent, hovering, descent of the aircraft as well as in high speed horizontal flight thereof.

Further objects and advantages of the invention will appear in the following description, the appended claims, and the accompanying drawings in which Fig. 1 is a schematic illustration of an improved form of tractor propeller convertible aircraft embodying the improvements of the present invention; Fig. 2 is a schematic illustration of a pusher propeller convertible aircraft embodying the improvements of the present invention; Fig. 3 is an enlarged perspective view of the pusher propeller convertible aircraft indicated in Fig. 2 and showing more fully the constructional details; Fig. 4 is a perspective view of the improved combined variable pitch, cyclic pitch, and variable blade twist or warp propeller construction together with the coordinate control and driving elements therefor with some of these parts in section to more clearly reveal the details of construction, Fig. 5 is a diagram showing the selective control circuit connections for the small but powerful electric motor driven mechanism that varies the twist or warp of the propeller blades shown in Fig. 4; Figs. 6 and 7 are perspective views partly in section of two different modified forms of variable warp propeller blade construction; and Fig. 8 is a partial view of one of the transverse ribs of the blade shown in Fig. 7 illustrating more clearly the detail construction of the improved form of locking type blade warping mechanism.

In carrying out the present invention in one form as shown in Fig. 1, the improved convertible aircraft 10 is constructed with a streamline high speed airplane type fuselage 11 provided with diminutive low drag wings 12 for sustaining the weight of the aircraft 10 in horizontal flight and with the improved form of variable pitch, variable cyclic pitch and variable twist or warp propeller 13 mounted axially at the nose of fuselage 10. The detailed structure of the improved propeller 13 and its twistable centrifugally extended coning blades 14 together with the variable pitch, variable cyclic pitch, and variable twist control mechanism therefor are shown in Fig. 4 and described more fully hereinafter.

As indicated in Fig. 1, suitable collapsible landing gear 15 is provided for maintaining the craft 10 standing upright on the ground upon its tail. Hence the craft 10 can rise vertically into the air under control of a pilot in the pilot's compartment 16 with the improved form of propeller 13 acting as a tractor and with relatively low pitch and warp of blades 14 to provide a readily controllable vertical coning thrust component greater than the total weight of the aircraft 10. The vertical ascent, hovering and descent of the aircraft 10 is readily controlled by varying the average pitch of the propeller blades 14 and the driving power applied thereto. The variable cyclic pitch control of the blades 14 enables the attitude of the craft 10 in the air to be readily and quickly varied for sidewise maneuvering and stabilizing purposes in the vertical attitude $a$ or for horizontal flight in the horizontal attitude $b$.

In horizontal flight of the aircraft 10 the thrust of propeller 13 is materially reduced and the maximum pitch and warp of the blades 14 is provided when maximum forward speed is desired. The propeller cyclic blade pitch control may then be utilized to direct the course of the aircraft in lieu of the usual rudder and elevator surfaces. To land, the craft 10 is again headed straight up in the air into attitude $a$ and the blade pitch and warp reduced either for autorotation or just below the hovering value so that the craft 10 will float downwardly at a desired low rate of descent.

In carrying out the invention in the preferred form, shown in Figs. 2 and 3, the aircraft 10a is constructed with low drag sustaining wings 11 for sustaining the weight of the craft in horizontal flight and with a pusher propeller 13 of the improved form shown in Fig. 4 mounted axially at the tail. Suitable collapsible landing gear 15 is provided for standing the craft 10a upright on the ground on its nose. Thus upon proper adjustment by the pilot of the blade pitch and twist controls for propeller 13 as well as the engine throttle 18 to provide sufficient driving power, the craft 10a can be made to back into the air and hover nose down in attitude $c$. To convert the craft to horizontal flight when a sufficient altitude is reached, both the pitch and warp of propeller 13 are reversed and the craft 10a then will accelerate towards the ground until it reaches flying speed, as indicated in Fig. 2, at which point it may be straightened out by manipulation of the propeller cyclic pitch control and directed thereby into horizontal high speed flight in attitude $d$ with maximum reverse pitch and warp of the blades of propeller 13.

To prepare for landing, the pitch and warp of propeller 13 again is reduced and in case a quick stop should become imperative, the pitch and warp of blades 14 may be reversed to act as a powerful brake to arrest the forward progress of the craft 10a or even reverse the craft into attitude $e$. The craft 10a then can descend, nose down, at minimum speed, due to autorotation of blades 14, even with power off. In case the pilot decides to reduce the rate of descent, the power can again be applied to drive the propeller 13 and the pitch and warp of blades 14 changed until the most efficient conditions desired for hovering are obtained. The craft 10a thus can approach the ground as slowly as desired so as to make landing even in a small restricted area an exceedingly simple and straightforward operation.

As shown more in detail in Fig. 3, the pusher propeller aircraft 10a may be provided with a fuselage 11 of longitudinally extended streamline form with a pair of wings 12 extending oppositely therefrom and with the pusher propeller 13 in suitable axial alignment with the fuselage 11 for high speed horizontal flight. The fuselage may be provided with suitable recesses 17 for receiving the retractable landing gear 15 when the aircraft is in flight. The landing gear 15 is mounted at the nose of the aircraft 10a opposite the pusher propeller 13 and is arranged to maintain the fuselage 11 standing upright on the ground with the axis of propeller 13 vertical as shown to insure ample space for free rotation of the extended blades 14 that may overlap the wings 12 as shown.

Suitable power means 20 shown in the form of a conventional internal combustion engine having a suitable power control throttle 18 is provided for driving the rotating blades 14 of the propeller 13 through the agency of the usual overrunning oneway drive clutch mechanism 21, shaft 22, the speed reducing gearing 23 and the hollow propeller shaft 24. The countertorque indicated by arrow T and exerted by the propeller 13 in powered flight is balanced by suitable means, preferably by a pair of oppositely disposed small auxiliary propellers 27 and 28 which are connected respectively by the shafts 29, 30 so as to be driven whenever propeller 13 is rotating, preferably being driven through suitable beveled gearing directly from the shaft 22 since shaft 22 is released from the engine 20 in case of engine failure by means of the oneway clutch drive mechanism 21. The balancing torque exerted by the two auxiliary propellers 27, 28 may be varied by varying the pitch of the auxiliary propeller blades under the control of the twistable handle 31. As shown, handle 31 operates through the push-pull flexible cables 32, 33 to vary the pitch of the blades of both of the auxiliary propellers 27, 28 by any usual form of blade pitch changing mechanism. In addition suitable electric motor operated control mechanism 34 is provided for oppositely rotating each of the auxiliary propellers 27 and 28 about the axis of their drive shafts 29 and 30 so that these auxiliary propellers both can be aligned axially with the main propeller 13 as indicated so as to supplement the thrust thereof in airplane flight.

The twistable control handle 31 is shown as carried on a cyclic pitch control lever 35 that controls the cyclic pitch of the main propeller blades 14 through the agency of the mechanism shown in Fig. 4 as explained hereinafter. The average blade pitch control lever 36 may be mounted on the opposite side of the pilot's seat 37 in the pilot's compartment 16 and is connected through the mechanism shown in Fig. 4 so as to vary the average pitch of the main propeller blades 14.

As shown in Fig. 4, the main propeller hollow drive shaft 24 is rotatably mounted by means of the ball bearings 40 and is provided with the two-way ball thrust bearings 41 to transmit the heavy axial thrust developed by the propeller 13 to a strong structural member 42 of the fuselage 11. The driving gear 23 is fixed to the hollow shaft 24 by the key 43.

The hollow propeller shaft 24 is provided with a blade pivot head 45, preferably formed integral therewith, for mounting the two pivot yokes 46 and 47 on the pivot pins 48 and 49. The pivot yoke 46 rotatably carries the tubular spar 50 that constitutes the main supporting and tension member as well as the warp axis for the twistable blade 14. As shown spar 50 extends through the twistable blade 14 along the quarter chord of the blade envelope 51 so that the reactive aerodynamic forces are substantially balanced on the opposite sides of the axis formed by the spar 50.

The variable warp blade 14 is provided with an outer twistable envelope or skin 51 of airfoil section preferably formed of relatively thin but strong metal or other material such as plywood having suitable corrugations 51a provided along the trailing edge thereof so as to provide sufficient lengthwise flexibility to allow substantial twisting of the blade 14 without wrinkling of envelope 51. The envelope or skin 51 is carried by a series of transverse ribs 52, 53, and 54 and 55. The outer rib 55 at the tip of the blade is rigidly secured to the spar 50 while the other ribs 52, 53, and 54 are suitably mounted for rotation about the spar 50 as an axis.

In accordance with the present invention, any suitable twist control mechanism may be provided for obtaining the force required to twist the blade 14. Preferably a worm gear 56 is attached to the inner rib 52 as disclosed and claimed in the Bensen application, Serial Number 679,789, assigned to the same assignee as the present invention, and filed June 27, 1946, concurrently herewith and now Pat. No. 2,584,663. The gear 56 is arranged to be rotated by worm 57 carried in the bracket 58 which is fixedly secured to the spar 50. Thus upon rotation of worm 57, worm wheel 56 is rotated about spar 50 to carry the inner rib 52 in a corresponding direction and thereby transmit a twisting force through skin 51 to rotate the succeeding ribs 53 and 54. In this way rib 54 can be angularly displaced about spar 50 a limited amount determined by the engagement of stop pin 60 with one side of the notch 61 formed in the rib 54. Rib 53 likewise is provided with a similar pin 62 and notch 63 of greater width than notch 61 for limiting the angular displacement of rib 53 with respect to the spar 50. Likewise pin 64 and notch 65, which is wider than notch 63, is provided for limiting the angular displacement of the inner rib 52. Thus the width of the notches 61, 63, and 64 progressively increases so as to provide a desired retrogressive blade twisting from root to tip when worm wheel 56 is rotated in each direction.

The tip of the blade 66 is rigidly carried by the rib 55 which, in turn, is fixedly secured to the spar 50 and hence is twisted only the slight amount permitted by the torsional resiliency of the spar 50. Worm 57 is driven by a small but powerful electric motor 67 through the flexible shaft 68 as disclosed and claimed in the above Bensen application. Thus by reversing motor 67 worm gear 57 can be rotated in each direction. The motor 67 is mounted by means of block 69 directly upon the main propeller shaft 24 and the electrical reversing connections of motor 67 are established through the two slip rings 70, 71 having the brushes 72 and 73 in sliding electrical contact therewith and with the limit switches 74 and 75 connected in the circuit as shown in Fig. 5 and arranged to interrupt the motor circuit when the rib 52 is angularly displaced a predetermined maximum amount in each direction required to torsionally flex spar 50 a predetermined amount.

To control the twist or warp of blade 14, the reversing switch 76 is provided with a manual operating member 77 located for convenient operation by the pilot on the instrument board of the plane as shown in Fig. 3 so as to enable the pilot to reversely energize the blade twisting motor 67 as desired. As indicated in Fig. 5 when reversing switch 76 is moved to the right, motor 67 is energized from battery B through switch 76, conductor 78, brush 72, slip ring 70, conductor 79, limit switch 75 to rotate worm gear 56 in a clockwise direction and thereby angularly displace ribs 52, 53, 54 with respect to rib 55 and the blade tip 66 so as to twist the outer skin 51 of blade 12 to provide a predetermined limited twist or warp of the blade 12 suitable for maximum lifting thrust under stalled conditions and thus best adapted for hovering as well as vertical ascent and descent of the aircraft. When reversing switch 76 is moved to the opposite position, motor 67 is energized through conductor 80, brush 73, slip ring 71, conductor 81 and limit switch 74 to rotate motor 67 in a direction to angularly displace worm wheel 56 in the opposite direction. In this case the slots 65, 63 and 61 permit a materially increased angular displacement of the series of ribs 52, 53, and 54, so as to provide a predetermined maximum twist or warp of blade 12 suitable for the high blade pitch reduced propelling thrust under airplane flying conditions.

In case the propeller mechanism 13 is to be used as a tractor propeller on the aircraft 10 shown in Fig. 1, the pin and slot progressive angular displacement limiting connection of the ribs 52, 53, 54 are suitably arranged on one side for a minimum positive twist or warp most suitable for an average blade pitch of from about 0 or slightly negative to about 12 degrees so as to provide the maximum propeller aerodynamic efficiency as demanded by the aircraft flight attitude. The slots 61, 63, and 65 are proportioned on the other side to provide a materially increased maximum positive twist or warp suitable for the most efficient aerodynamic operation when the average pitch of the blade is materially increased to some positive value such as 30 to 40 degrees. In order to avoid excessive strains therein, the blade envelope or skin 51 preferably is formed so as normally to have a twist or warp conformation suitable for a pitch about midway between the minimum and maximum average pitch values cited above. Hence motor 67 must reversely twist the blade 14 from the normal conformation to each cited value.

When propeller 13 is to be used as a pusher propeller on aircraft 10a shown in Figs. 2 and 3, the same minimum twist is provided by slots 61, 63 and 65 for substantially the same minimum pitch of the blades to obtain the maximum propeller aerodynamic efficiency as demanded by the aircraft flight attitude. However, in this case the other sides of slots 61, 62 and 65 are so proportioned that the twist of the blade can be reversed to provide the necessary aerodynamic efficiency when the pitch of the pusher propeller blades is reversed to a substantial degree such as 30 or 40 degrees in propelling the aircraft of Figs. 2 and 3 in horizontal flight. Thus it will be seen that in the case of the pusher propeller both the twist and the pitch of blades 14 are reversed in order to provide for successful operation of the pusher type aircraft shown in Figs. 2 and 3.

The pitch of the propeller blades 14 is varied by means of the pilot's dual control levers 35 and 36. Lever 35 can vary the pitch of the blade cyclically while lever 36 controls the average pitch. As shown in Fig. 4 the cyclic pitch control lever 35 is provided with a split ball head 85 mounted for universal angular movement within the surrounding spherical casing 86 that in turn reciprocates within the surrounding cylindrical guide tube 87 under control of the average pitch control lever 36. Lever 36 is fixed to the shaft 88 carrying the slotted arms 89 that engage with pins 90 to raise or lower the casing 86 in the cylindrical guide tube 87.

Motion is transmitted from the ball head 85 of the cyclic pitch control lever 35 by means of the three equilaterally spaced ball joint pins 93, 94, and 95, each of which projects laterally from a corresponding one of the three sector shaped push-pull rods 96 that extend upwardly through the hollow propeller drive shaft 24 and are provided with a corresponding lateral ball joint pin 97 equilaterally spaced at the upper end thereof. The three ball joint pins 97 are seated in the inner bearing race 98 having the outer race 99 thereof of spherical shape and seated within the surrounding spherical collar 100 that in turn is mounted for up and down sliding movement within the cylindrical guide tube 101. These connections enable the angular movement of the cyclic pitch control lever 35 in any direction to produce a relative displacement of the three segmental based push rods 96 such as to cause both the inner and outer bearing races 98 and 99 to assume a planar position that is always parallel to the plane of the spherical head 85 of the cyclic pitch control lever 35. In other words, whenever lever 35 is moved to tilt head 85 in any direction the bearing races 98 and 99 tilt correspondingly in the same direction.

Motion is transmitted from the outer ball race 99 by means of the diametrically opposed pins 102 and 103 that extend through corresponding longitudinal slots 104, 105 formed in the guide tube 101. The motion is transmitted from pin 102 through the ball jointed connecting rod 106 to the curved lever arm 107 that extends from bracket 58 around the propeller drive head 45 so as to bring the lower ball joint of connecting rod 106 substantially in alignment with the axis of the blade mounting pin 48 when the ball races 98 and 99 lie in a plane perpendicular to the axis of the propeller shaft 24.

Whenever the ball races 98 and 99 are tilted from the plane perpendicular to the axis of shaft 24, the pin 102 will project on one side or the other of the perpendicular plane during each half revolution of the propeller shaft 24. As a result, an oscillating movement will be imparted through ball jointed connecting rod 106 to arm 107 to produce a cyclic pitch change of the propeller blade 14. This is due to the fact that bracket 58 is fixed to spar 50 and thus serves to oscillate the entire blade 14 about the axis of spar 50 which is rotatably mounted in the pivoted yoke 46.

It will be understood that the opposite pin 103 is connected through a similar ball jointed connecting rod 108 to produce an equal but opposite cyclic pitch variation of the other blade of the propeller 13. Consequently, whenever the cyclic pitch control lever 35 is moved in any direction out of alignment with the axis of the propeller shaft 24, then the two coning blades of the propeller 13 will each produce a cyclically unbalanced aerodynamic reaction at the point of maximum pitch, thus causing the blades to shift the axis of the cone and thereby produce an unbalanced force tending to shift the axis of the propeller shaft 24. In this way the cyclic pitch control enables the attitude of the aircraft to be varied as desired by shifting the axis of the propeller shaft 24. Consequently, the cyclic pitch control enables the aircraft to be steered in any direction without recourse to the usual rudders, ailerons or other usual forms of aircraft control.

The axial thrust component of propeller 13 is varied by shifting the pitch control lever 36 and correspondingly varying the power applied to drive the propeller. When pitch control lever 36 is moved to slide casing 86 upwardly in guide tube 87 then all three of the segmental push rods 96 are moved simultaneously. This results in a corresponding sliding movement of ball races 98 and 99 together with sleeve 100 upwardly in the guide tube 101. Hence connecting rod 106 is raised correspondingly to tilt arm 107 and bracket 58 and thereby rotate spar 50 to increase the pitch of blade 14. In a similar way connecting rod 108 is raised to correspondingly increase the pitch of the other blade of the propeller. Thus the coning angle of both blades is increased simultaneously and when the driving power is correspondingly increased the axial coning thrust component is likewise increased. In this way the axial coning thrust component of propeller 13 can be made greater than the total weight of the aircraft in order to cause the aircraft to ascend vertically from the ground.

When the propeller mechanism shown in Fig. 4 is used as a pusher propeller in the form of aircraft 10a shown in Figs. 2 and 3, the vertical ascent of the craft 10a is continued until a substantial altitude is reached. Thereupon the cyclic pitch control lever 31 may be utilized to shift the attitude of the aircraft 10a in the air somewhat from the vertical and the average blade pitch may be reduced by operation of lever 36 so as to enable the aircraft to gain forward speed. When sufficient forward speed has been attained and the attitude of the craft 10a changed sufficiently to provide for normal horizontal flight, both the pitch and twist of the propeller blades are reversed by manipulation of the corresponding controls 35, 36, and 77, so as to continue impelling the craft forward in horizontal flight at relatively high speed. In this case the small countertorque propellers 27 and 28 which serve to counterbalance the torque of the main propeller during ascent are arranged to be revolved about the axis of their drive shafts 29 and 30 by motors 34 so as to add their aerodynamic propulsive force to that of the main propeller in the line of forward horizontal flight.

When it becomes desirable to land the pusher aircraft shown in Figs. 2 and 3, both the pitch and warp of the propeller blades 14 are again reduced and if desired reversed in an emergency so as to provide a powerful reverse axial thrust tending to arrest the forward flight of the aircraft. Thus the reverse propeller thrust can be made sufficient to cause the craft to tend to fly backwards or at least hover suspended nosedown on the propeller. Such ability to stop quickly and even reverse the direction of flight in an emergency enables accidents to be avoided. With the hovering aircraft suspended nosedown from the propeller, the driving power may be reduced and the reversed blade pitch and twist also reduced to the values suitable for autogyration independent of the driving engine. In this way the craft 10a can be floated slowly downward until a suitable landing area is selected. Then by means of the pitch control levers 35 and 36 the plane readily may be maneuvered over the area and a slow and safe descent thereto effected.

In the modified variable warp propeller blade 14 construction shown in Fig. 6 improved means are provided for transmitting the twisting forces independently of the blade skin or envelope. Thus the blade envelope 51 may be formed of very thin readily twistable material pressed into airfoil section and provided with a series of expansible corrugations 51a along the trailing edge for providing relative lengthwise movement thereof upon warping of the blade 14. The thin envelope 51 is carried on a series of transverse ribs 115, 116, 117 and 118, each of which is mounted for rotation about the axis of the composite spar formed by the two concentric tubes 120 and 121. The two tubes 120 and 121 are relatively rotatable but are rigidly fastened together at their outer ends with the tip of the blade 66 rigidly fixed thereto. It will be understood that the inner end of the inner tube 120 is provided with suitable articulated pivotal and rotational connections 46 and 58 with the hub of the propeller in the same manner as shown in Fig. 4 and previously described so as to enable variable pitch and cyclic pitch control of the blade 14 to be obtained. The outer tube 121 carries rigidly secured thereto a worm gear 56 with the driving worm 57 thereof mounted in the arm 58 and driven through the flexible shaft 68 in substantially the same manner as shown in Fig. 4. Thus by rotating the worm wheel 56 the inner end of the outer tube 121 can be rotated relative to the inner tube 120 due to the torsional resiliency of both tubes. The outer tube 121 serves to carry the series of ribs 115, 116 and 117 that are rigidly secured thereto along therewith to retrogressively warp the thin blade envelope 51 from root to tip of blade 14. The angular displacement of each rib in the series automatically is progressively less than the preceding rib due to the cumulative twisting of the outer tube 121 relative to the inner tube 120 while the tip 66 of the blade 14 is maintained relatively fixed since it is rigidly secured to the outer end of the two concentric tubes 120 and 121 which constitute the warp axis of the blade. Preferably the concentric tubes 120 and 121 extend lengthwise through the blade 14 approximately at the quarter chord axis of the blade in order not only to maintain in balance the aerodynamic forces on the opposite sides of the blade axis but also equalize the resilient torsional forces. During the warping of the blade the corrugations 51a formed at the trailing edge thereof are progressively straightened out so as to provide for the slight increase in length of the blade envelope 51 at the trailing edge required to enable warping thereof without wrinkling or undue distortion.

The two concentric tubes 120 and 121 preferably are tapered and formed to provide a running fit therebetween such as to enable a desired relative rotation throughout the length thereof even though the outer ends are fixedly secured together. If desired, the running fit can be made such that a substantial friction between the two relatively rotatable tubes 120 and 121 is produced in order to dampen out any flutter of the blade in case the aerodynamic forces tend to become unbalanced in flight.

In the blade modification shown in Fig. 7 a similar series of ribs of which only ribs 125 and 126 are shown are rotatably mounted upon the single tubular spar 129 so as to carry the thin twistable blade envelope 51 having corrugations 51a. It will be understood that the axial spar 129 is provided with articulate pivotal and rotational mounting connections with the propeller hub the same as previously described and extends through the blade envelope 51 to provide a warp axis at substantially the quarter chord axis of the blade. In this modification rib 125 is provided with a cam shaped opening 130 through which the rotatable warp control tube or rod 131 extends. The control tube or rod 131 is rotatably mounted in the brackets 132 that are suitably secured, as by welding, to the main tubular spar 129. The control rod 131 carries an eccentric cam finger 133 shown as mounted in the arm 134 fixed to rod 131.

When the warp control rod 131 is in the angular position shown in Fig. 7, the cam finger 133 engages with one side of the cam opening 130 so as to maintain the rotatable rib 125 in a fixed angular position with the control rod 131 and cam finger 133 engaging the opposite sides of the cam opening 130. Upon rotation of the control rod 131 in a clockwise direction, the finger 133 is carried into a diametrically opposite position with respect to the cam opening 130 as shown in Fig. 8, thus rotating the rib 125 from its initial position indicated by the dotted lines into a different angular position, as shown by the full lines. The shape of the cam opening 134 is such that the rib 125 is locked in each position by the engagement of the cam finger 133 and the control rod 131 with the opposite sides of the opening.

The adjacent rib 126 is provided with a similar cam opening 136 with which the control rod 131 and the cam finger 137 cooperate in substantially the same way as just described. However, the arm 138 carries the cam finger 137 closer to the axis of the rod 131 so that the angular movement of rib 126 is not as great as the angular movement of rib 125. It will be understood that the successive ribs of blade 14 are provided with similar cam shaped openings and cams, progressively closer to the axis of the control shaft 131 and proportioned to effect a desired retrogressive warping of the blade envelope 51 from root to tip upon rotation of the warp control shaft 131 to the angular position shown in Fig. 8. In the opposite angular position of the warp control shaft 131, the series of cam fingers and cam openings may provide a zero twist conformation of the blade or a slight twist suitable for autorotation. In both cases the warp control shaft 131 and the series of cam fingers carried thereby effectively lock all of the ribs rotatably carried by the axial supporting spar 129 in a predetermined angular position thereon so as to provide a correspondingly fixed desired twist conformation to the blade envelope 51. It will be understood that the blade 14 shown in Fig. 7 has the tip thereof rigidly secured to the outer end of the spar 129 and that the latter is provided with variable average pitch and cyclic pitch control means in the same way as previously described.

The warp control rod 131 may be reversely rotated by means of a worm and worm gear as previously described, or by other suitable means such as shown in Fig. 7.

As shown in Fig. 7, the warp control rod 131 is biased to return to the position of warp for autorotation and hovering by the relatively strong biasing spring 140. The reverse actuating cable spool 141 is fixed to the end of shaft 131 and the actuating cable 142 therefor passes over pulleys 143 and 144 and is connected by means of the rod 145 to the plunger 146 of the hydraulic actuator 147. Thus by controlling the supply of fluid under pressure to actuator 147 the rod 131 can be reversely rotated against the bias of spring 140 to warp the blade 14. The hydraulic fluid for controlling actuator 147 may be supplied from the pilot station through a conduit 148, and the fluid pressure in conduit 148 controlled at the pilot station by any conventional means such as a hand or food operated hydraulic pressure cylinder (not shown). It will be understood that a similar cable mechanism is provided for enabling the actuator 147 to warp the opposite blade of the propeller simultaneously.

The location of the pulleys 143 and 144 preferably is such as to give the minimum change in length of the actuator cable, either as the blades cone about their hinge axis pin 68 or are rotated by the pitch control arm 107. These lengths can be made as invariant as are necessary on an arrangement similar to that employed on a dental drill. However, since the blade is intended to be in one of two positions most of the time and in each of these positions the cam actuators 133 and 137 are on center, a small amount of cam movement does not materially affect the blade warp.

What I claim as new and desire to secure by Letters Patent of the United States is:

1. An aircraft provided with airfoils for sustaining said aircraft in substantially horizontal flight and having in combination a power driven rotary propeller in axial alignment with the longitudinal axis of said aircraft, said propeller having coning blades articulated at and radially extending from the propeller hub, means for varying the pitch of said propeller blades to provide a vertical propeller thrust greater than the weight of said aircraft when said aircraft is in a vertical position and to provide horizontal thrust and lift to maintain said aircraft in a substantially horizontal position, means for varying the cyclic pitch of said propeller to shift the thrust line in relation to the longitudinal axis of said aircraft, and power driven rotary auxiliary propellers mounted at the tips of said airfoils for rotation in planes parallel to the plane of said airfoils to provide torque control of said aircraft about its longitudinal axis.

2. An aircraft capable of both vertical and horizontal flight having in combination, a fuselage provided with sustaining airfoils for horizontal flight, a rotary main propeller in axial alignment with said fuselage and provided with power driving means, said propeller having variable pitch coning blades articulated at and radially extending from the propeller hub, means for controlling the pitch of said blades to provide a vertical propeller thrust greater than the weight of said aircraft when said aircraft is in a vertical position and to provide a strong horizontal thrust and lift when said aircraft is in a horizontal position, and power driven auxiliary propellers mounted at the tips of said airfoils, said auxilary propellers being adjustable to positions for rotation in planes parallel to the plane of said airfoils and to positions for rotation in planes parallel to the plane of rotation of said main propeller to provide torque control of said aircraft about its longitudinal axis when said aircraft is in a vertical position, and to provide a supplemental horizontal thrust when said aircraft is in horizontal flight.

3. An aircraft capable of both vertical and horizontal flight having in combination a fuselage provided with sustaining airfoils for horizontal flight, a rotary propeller in axial alignment with the longitudinal axis of said fuselage and provided with power driving means, said propeller having centrifugally extended warpable variable pitch coning blades articulated at the propeller hub, means for controlling the pitch and warp of said propeller blades to provide a vertical propeller thrust greater than the weight of said aircraft when said aircraft is in a vertical position and to provide lift and horizontal thrust to maintain said aircraft in a horizontal position, and power driven thrust devices rotatably mounted at the tips of said airfoils on a pivotally articulated axle member constituting the axis of rotation of said devices, and means connected to vary the angular position of said axle member to control said axis of rotation of said thrust devices with respect to the plane of rotation of said propeller to provide torque control of said aircraft when said aircraft is in vertical flight and to provide a supplemental horizontal thrust to said propeller when said aircraft is in horizontal flight.

DAVID C. PRINCE.

(References on following page)

REFERENCES CITED

The following references are of record in the file of this patent:

UNITED STATES PATENTS

| Number | Name | Date |
|---|---|---|
| 1,145,013 | Gallaudet | July 6, 1915 |
| 1,427,015 | Pescara | Aug. 22, 1922 |
| 1,454,944 | Pescara | May 15, 1923 |
| 1,526,230 | Pescara | Feb. 10, 1925 |
| 1,611,717 | Bushyager | Dec. 21, 1926 |
| 1,875,267 | Savoja | Aug. 30, 1932 |
| 2,030,578 | Flettner | Feb. 11, 1936 |
| 2,317,340 | Bennett | Apr. 27, 1943 |
| 2,352,342 | Pitcairn | June 27, 1944 |
| 2,352,404 | Pitcairn | June 27, 1944 |
| 2,382,460 | | |
| 2,387,762 | | |
| 2,397,632 | | |
| 2,418,030 | | |
| 2,437,165 | | |
| 2,437,789 | | |
| 2,475,121 | | |
| 2,484,099 | | |
| 2,584,663 | | |
| 2,382,460 | Young | Aug. 14, 1945 |
| 2,387,762 | Leonard | Oct. 30, 1945 |
| 2,397,632 | Stuart | Apr. 2, 1946 |
| 2,418,030 | Hirsch | Mar. 25, 1947 |
| 2,437,165 | Locke | Mar. 2, 1948 |
| 2,437,789 | Robins | Mar. 16, 1948 |
| 2,475,121 | Avery | July 5, 1949 |
| 2,484,099 | Koeppe | Oct. 11, 1949 |
| 2,584,663 | Bensen | Feb. 5, 1952 |

FOREIGN PATENTS

| Number | Country | Date |
|---|---|---|
| 532,399 | France | Nov. 14, 1921 |
| 543,720 | France | June 9, 1922 |